(12) United States Patent
Wing (10) Patent No.: US 11,951,811 B1
(45) Date of Patent: Apr. 9, 2024

(54) KIT FOR RETROFITTING A PIVOTING WINDOW OF A VEHICLE

(71) Applicant: Bradley Wing, Peoria, AZ (US)

(72) Inventor: Bradley Wing, Peoria, AZ (US)

( * ) Notice: Subject to any disclaimer, the term of this patent is extended or adjusted under 35 U.S.C. 154(b) by 0 days.

(21) Appl. No.: 18/377,127

(22) Filed: Oct. 5, 2023

(51) Int. Cl.
  *E05C 9/04* (2006.01)
  *B60J 1/00* (2006.01)
  *B60J 1/14* (2006.01)

(52) U.S. Cl.
  CPC ............... *B60J 1/14* (2013.01); *B60J 1/007* (2013.01)

(58) Field of Classification Search
  CPC .................................. B60J 1/14; B60J 1/007
  See application file for complete search history.

(56) References Cited

U.S. PATENT DOCUMENTS

| | | | | |
|---|---|---|---|---|
| 4,007,958 A * | 2/1977 | Peifer | ............... | B62D 33/0617 |
| | | | | 15/250.003 |
| 4,116,483 A * | 9/1978 | Kramer | ............... | B60J 1/04 |
| | | | | 296/206 |
| 4,392,669 A * | 7/1983 | Martin, Jr. | ............... | B60K 1/04 |
| | | | | 280/775 |
| 5,791,727 A * | 8/1998 | Doescher | ............... | B60J 1/14 |
| | | | | 296/146.16 |
| 6,330,765 B1 * | 12/2001 | Dahl | ............... | B62D 33/0621 |
| | | | | 49/463 |
| 6,823,632 B2 * | 11/2004 | Yun | ............... | B60J 1/085 |
| | | | | 49/141 |
| 7,891,724 B2 * | 2/2011 | Skierkiewicz | ............... | B60J 1/16 |
| | | | | 296/146.2 |
| 9,995,069 B2 * | 6/2018 | Ghantous | ............... | E05F 1/043 |
| 11,260,730 B2 * | 3/2022 | Binstock | ............... | E02F 9/16 |
| 2011/0192091 A1 * | 8/2011 | Smith | ............... | B60J 1/16 |
| | | | | 49/504 |

FOREIGN PATENT DOCUMENTS

| | | | | |
|---|---|---|---|---|
| CH | 688936 A5 * | 6/1998 | ............... | E05B 17/06 |
| CN | 112277582 A * | 1/2021 | ............... | B60J 1/10 |
| DE | 20212513 U1 * | 2/2004 | ............... | B60J 1/14 |
| DE | 102005037926 A1 * | 2/2007 | ............... | B60J 1/001 |
| DE | 202006018707 U1 * | 4/2007 | ....... | B32B 17/10045 |
| EP | 0566530 A2 * | 10/1993 | | |
| WO | WO-2012148968 A1 * | 11/2012 | ............... | B60J 1/14 |
| WO | WO-2013184356 A1 * | 12/2013 | ......... | E05F 15/2015 |

\* cited by examiner

*Primary Examiner* — Jerry E Redman
(74) *Attorney, Agent, or Firm* — Bruce A. Lev (57) ABSTRACT

A kit for retrofitting a pivoting window of a vehicle including a secondary window frame attachable to the original window frame of the vehicle and adapted to provide additional clearance between the pivoting window and any adjacent panels or parts of the vehicle, a connector adapted to connect the secondary window frame to the original window frame, and a latch mechanism adapted to hold the pivoting window in a selected position with respect to the secondary window frame.

12 Claims, 8 Drawing Sheets

KIT FOR RETROFITTING A PIVOTING WINDOW OF A VEHICLE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

This invention relates generally to pivoting vehicle windows, and more specifically to retrofitting pivoting vehicle windows to provide additional clearance between a pivoting window and any adjacent panels or parts of a vehicle.

2. Description of the Related Art

Prior art pivoting vehicle windows are designed to pivot and avoid contacting any panels or parts of the vehicle. However, vehicles are continuously being redesigned and in some cases the pivoting windows are excluded due to inherent contact between the pivoting window and any adjacent panels or parts of the vehicle. As such, air flow into and out of the vehicle is impeded reducing the quality of the environment within the vehicle for occupants.

Accordingly, the present invention overcomes the disadvantages associated with the prior art, by providing a kit for retrofitting a pivoting window of a vehicle that includes a secondary window frame attachable to the original window frame of the vehicle and adapted to provide additional clearance between the pivoting window and any adjacent panels or parts of the vehicle, a connector adapted to connect the secondary window frame to the original window frame, and a latch mechanism adapted to hold the pivoting window in a selected position with respect to the secondary window frame.

BRIEF SUMMARY OF THE INVENTION

In view of the foregoing disadvantages inherent in the known types of vehicle pivoting windows or the like in the prior art, the present invention provides a kit for retrofitting a pivoting window of a vehicle. As such, the general purpose of the present invention, which will be described subsequently in greater detail, is to provide a kit for retrofitting a pivoting window of a vehicle including a secondary window frame attachable to the original window frame of the vehicle and adapted to provide additional clearance between the pivoting window and any adjacent panels or parts of the vehicle, a connector adapted to connect the secondary window frame to the original window frame, and a latch mechanism adapted to hold the pivoting window in a selected position with respect to the secondary window frame, with all the advantages of the prior art and none of the disadvantages.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

BRIEF DESCRIPTION OF THE DRAWINGS

The figures which accompany the written portion of this specification illustrate embodiments according to the teachings of the present invention.

The various embodiments of the present invention will hereinafter be described in conjunction with the appended drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The following embodiments and the accompanying drawings, which are incorporated into and form part of this disclosure, illustrate embodiments of the invention and together with the description, serve to explain the principles of the invention. To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

Figure 1:
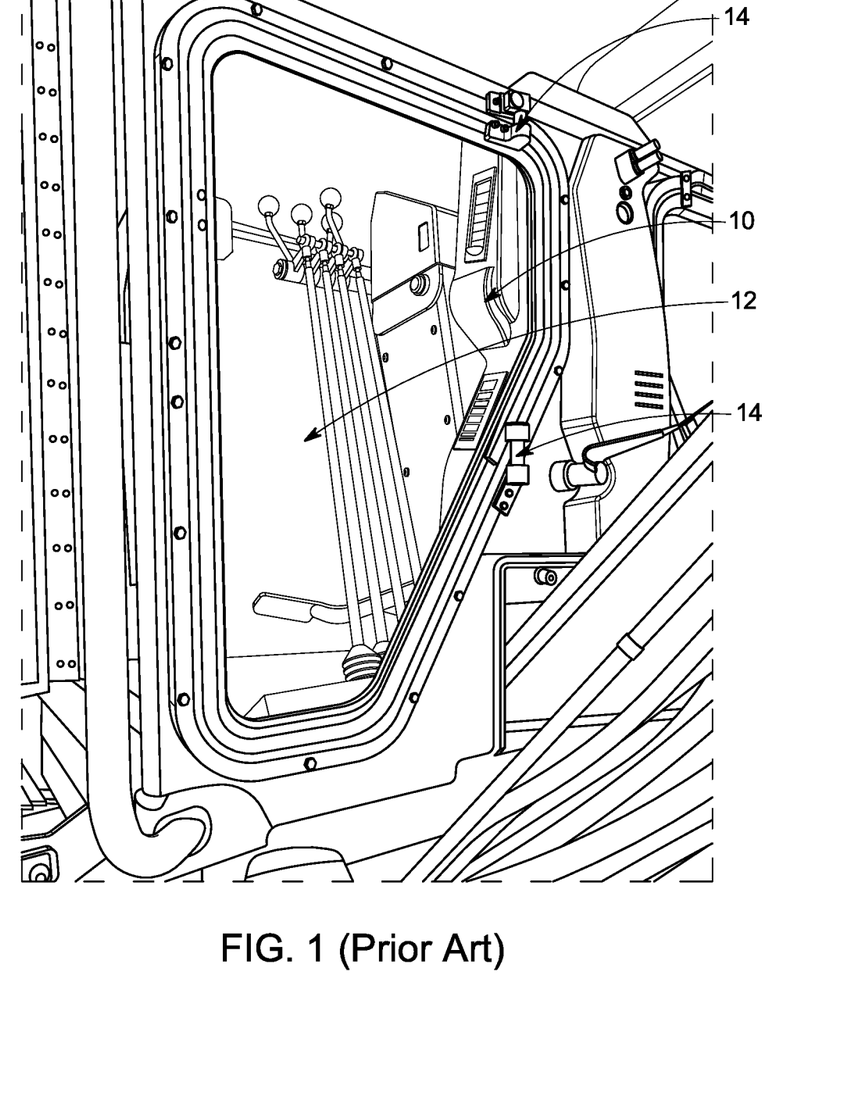
FIG. 1 shows a perspective view of a prior art vehicle pivoting window upon an older version of a known motor grader vehicle.
Figure 2:
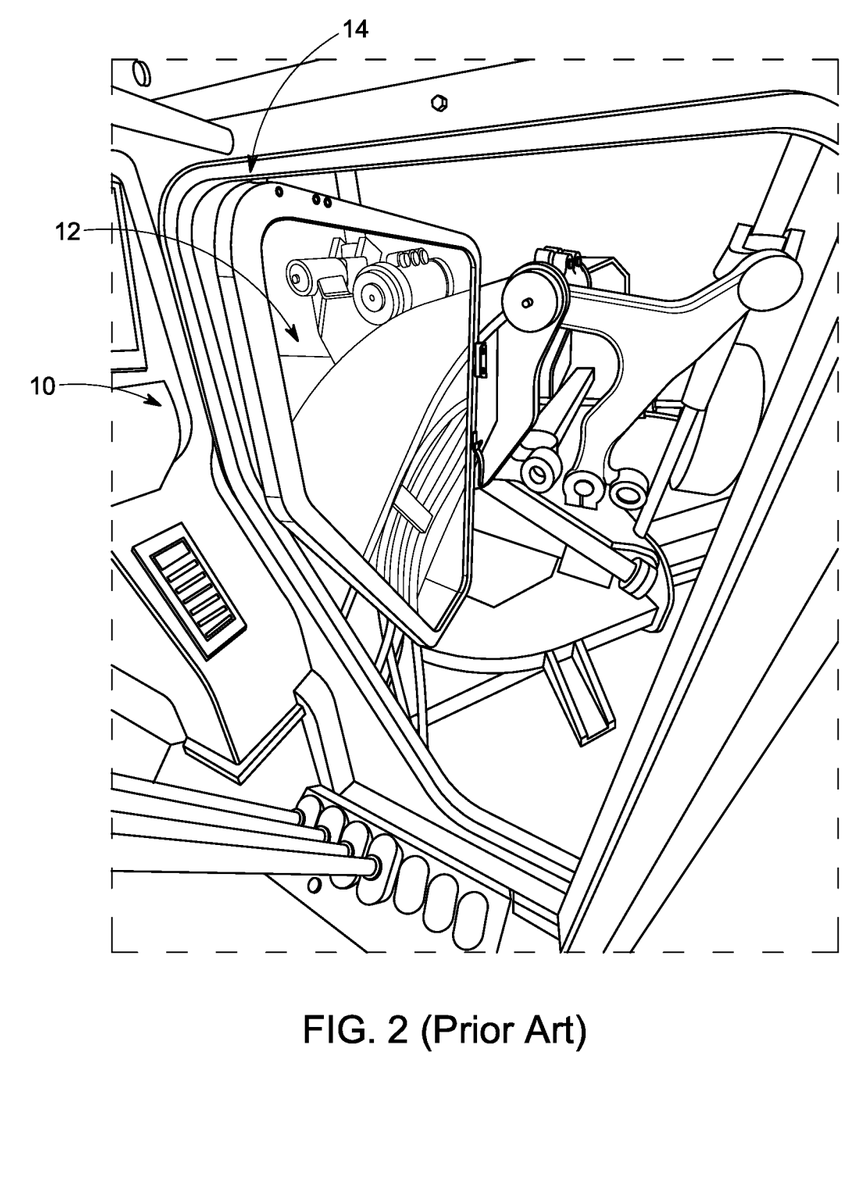
FIG. 2 shows a perspective view of the prior art vehicle pivoting window pivoted into an open position upon the older version of the known motor grader vehicle of FIG. 1.

FIG. 1 shows the original console 10 and window design 12 that came standard on the Caterpillar 140G and 140H model motor graders. The console was shaped appropriately to the window design to allow them to open outward. A "T" handle in the upper left corner was used to tighten the upper hinge 14 and keep the windows open. They lasted a while, but once you over tighten them, they strip and become useless. Most operators would use a bungee cord or strap to keep the windows open during operation, as rough terrain and wind would blow them closed. FIG. 2 shows how there is no obstruction when opening.

Figure 3:
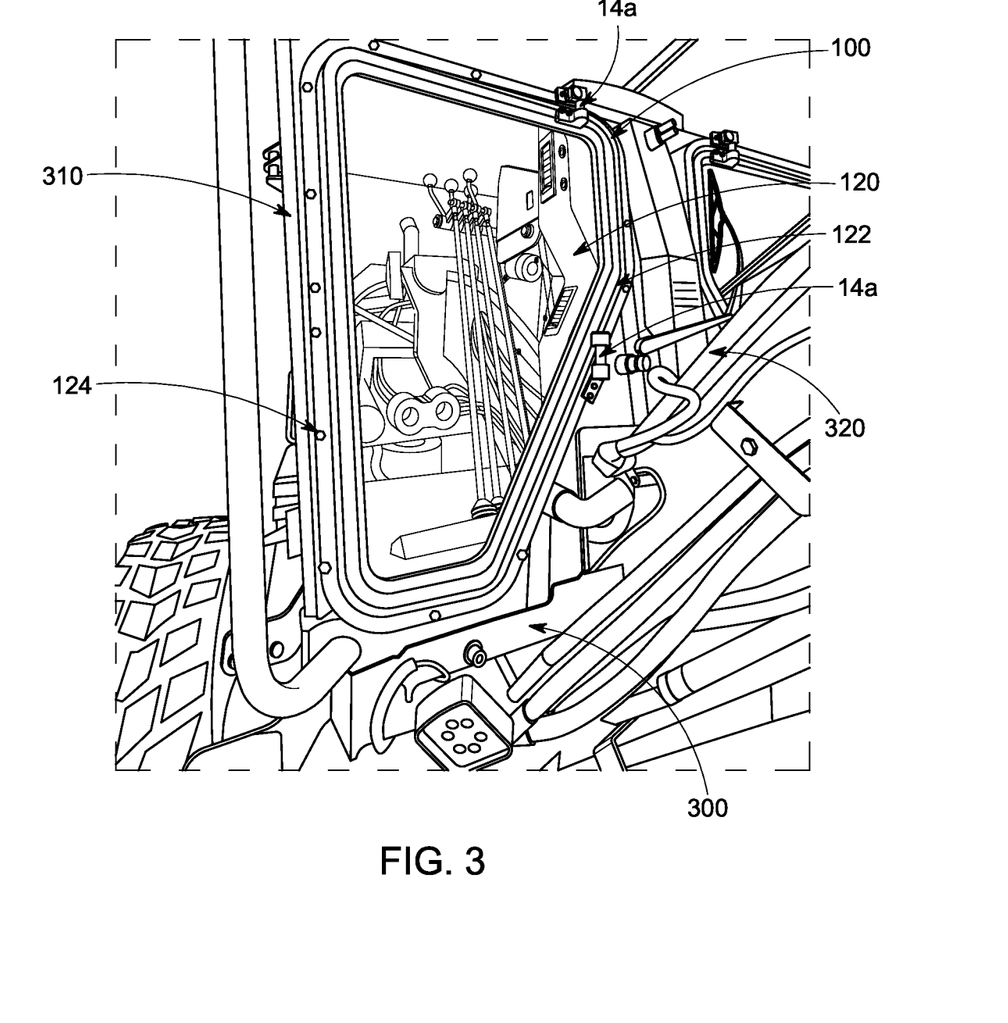
FIG. 3 shows a perspective view of the retrofitted pivoting vehicle window upon a redesigned version of the motor grader vehicle according to the preferred embodiment of the present invention.

FIG. 3 shows the new 140-13 Caterpillar motor grader window design. Notice the thickness of the frames. This is due to two sets of window frames being bolted together to create the clearance needed to clear the new console design. This was done by an independent fabricator here locally that Empire Southwest uses for these types of issues. Our grader was the first ever to have this design. Caterpillar does not offer a fix for this issue. When the new model graders were designed, they streamlined the cab design, and did away with the windows that open, and only offer them in a sealed design. Very short sighted on their part, due to lack of visibility from glare and reflection in the windows during different lighting conditions.

Figure 4:
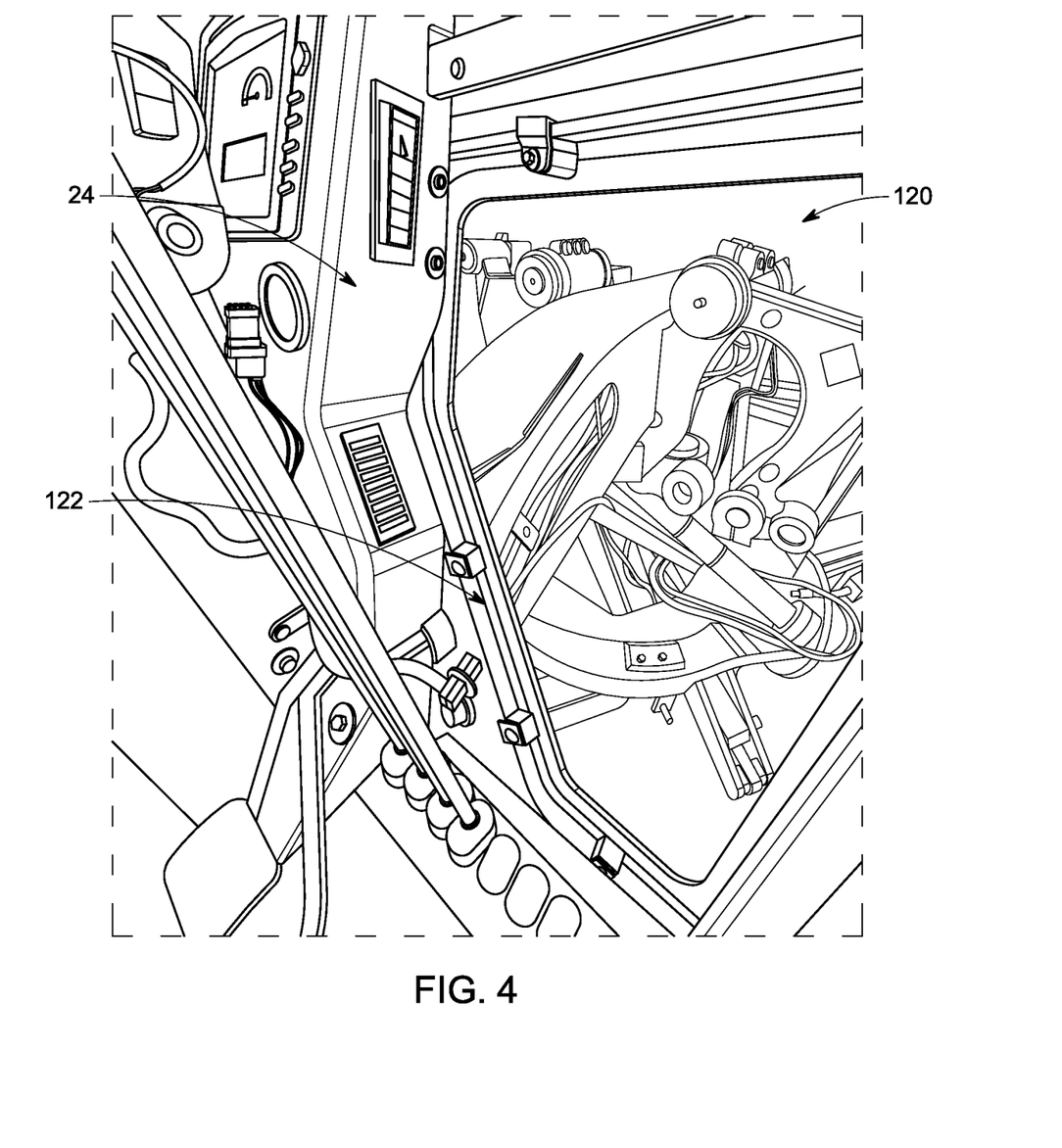
FIG. 4 shows an interior perspective view of the retrofitted pivoting vehicle window in a closed position and increasing the clearance between the pivoting vehicle window and interior panels and parts of the redesigned version of the motor grader vehicle according to the preferred embodiment of the present invention of FIG. 3.
Figure 5:
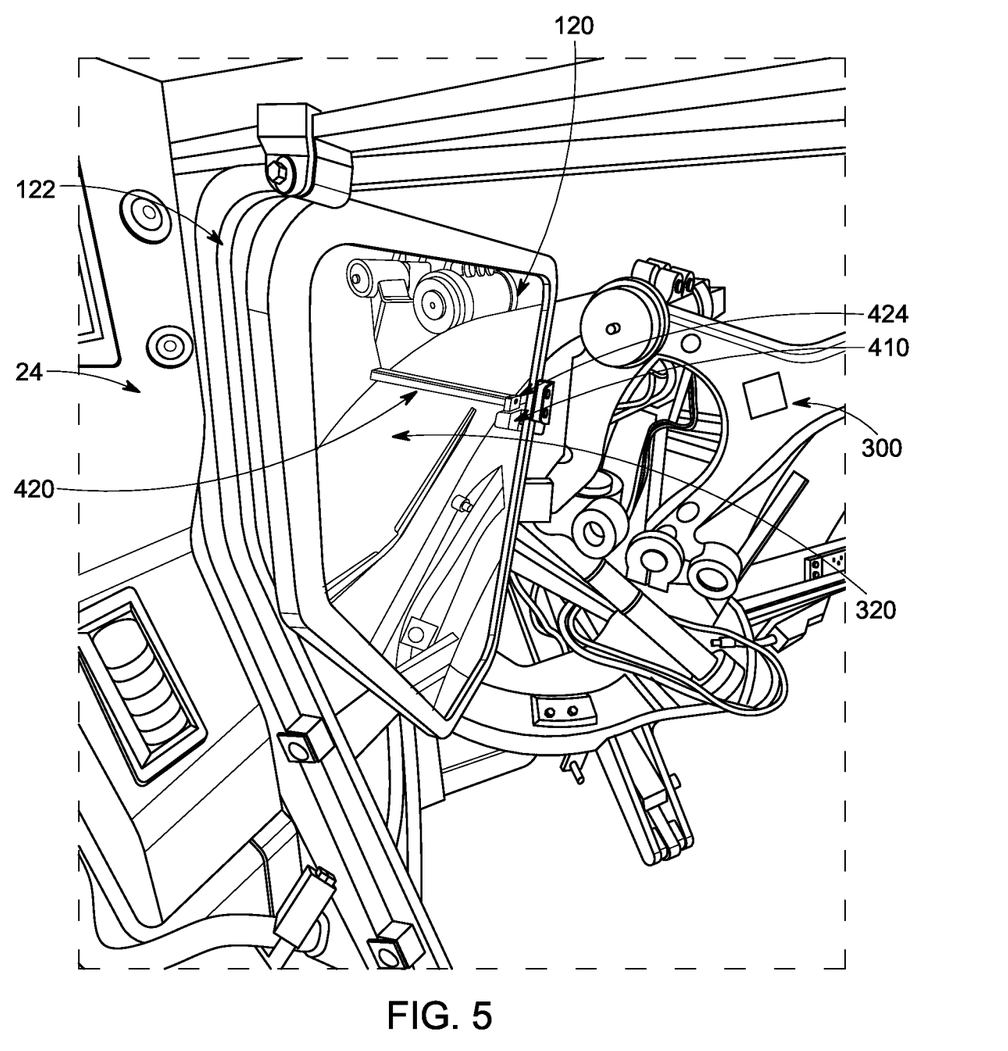
FIG. 5 shows an interior perspective view of the retrofitted pivoting vehicle window held in an open position via the latch mechanism, and increasing the clearance between the pivoting vehicle window and interior panels and parts of the redesigned version of the motor grader vehicle according to the preferred embodiment of the present invention of FIG. 3.

FIG. 4 shows in more detail the clearance issue with the new console 24, and how doubling up the framework creates the necessary clearance to open them. The "T" handle is eliminated so now there is no way to keep them open during operation other than a strap or cord. FIG. 5 is a reference photo showing the window in an opened position.

Turning now descriptively to FIGS. 3-8, the present invention discloses a combination of a vehicle 300 and a kit 100 for retrofitting a window of the vehicle, the combination comprising a vehicle 300 including a main body, a window frame 310 attached to the main body, a pivoting window 120 pivotally attached to the window frame, and at least one arm 320 extending outwardly from the main body; and a kit 100 for retrofitting the window of the vehicle 300, the kit comprising a secondary window frame 122 adapted to be attached to the window frame 310 of the vehicle and adapted to provide additional clearance between the pivoting window 120 and any adjacent panels or parts (ie, 24) of the vehicle, at least one connector 124 adapted to connect the secondary window frame 122 to the window frame 310 of the vehicle, and a latch 400 adapted to be attached between the at least one arm 320 and the pivoting window 120 and hold the pivoting window in a selected position with respect to the secondary window frame 122, wherein when the kit 100 is in use the pivoting window is detached from the window frame of the vehicle, the secondary window frame is attached to the window frame of the vehicle via the at least one connector, the pivoting window is then pivotally attached to the secondary window frame, and then the latch is removably attached between the arm of the vehicle and the pivoting window, such that the pivoting window is held in a selected position with respect to the secondary window frame.

In most embodiments, the secondary window frame 122 includes at least one hinge 14a adapted to releasably and pivotally attach the pivoting window 120 of the vehicle to the secondary window frame 122, such that the pivoting window is adapted to pivot with respect to the secondary window frame. And in the preferred embodiment the connector 124 is formed as at least one screw, however other types of connectors can be use, such as nuts and bolts. It should be noted that the secondary window frame 122 can be formed of several interconnecting parts to adjust the width thereof further, and a seal can also be incorporated and attached thereto to further prevent wind and moisture from passing into the interior of the vehicle 300 after the kit 100 is installed.

In the preferred embodiment, best shown in FIGS. 5-8, the latch 400 comprises a vehicle arm engaging portion 420 adapted to be releasably secured to the arm 320 of the vehicle, and a pivoting window engaging portion 410 including a slot 412 adapted to receive a portion of said pivoting window therein, and a biased pin 414 adapted to releasably hold the portion of the pivoting window within the slot, wherein the pivoting window engaging portion is attached to the arm engaging portion, and wherein when in use the latch is releasably secured to the arm of the vehicle, then a side edge of the pivoting window, or a handle bar attached thereto, is pushed against the biased pin of the pivoting window engaging portion and into the slot for releasably holding therein, and when desired the biased pin is pushed in such that the pivoting window can be removed from within the slot and pivoted into a closed position with respect to the window frame of said vehicle.

Figure 6:
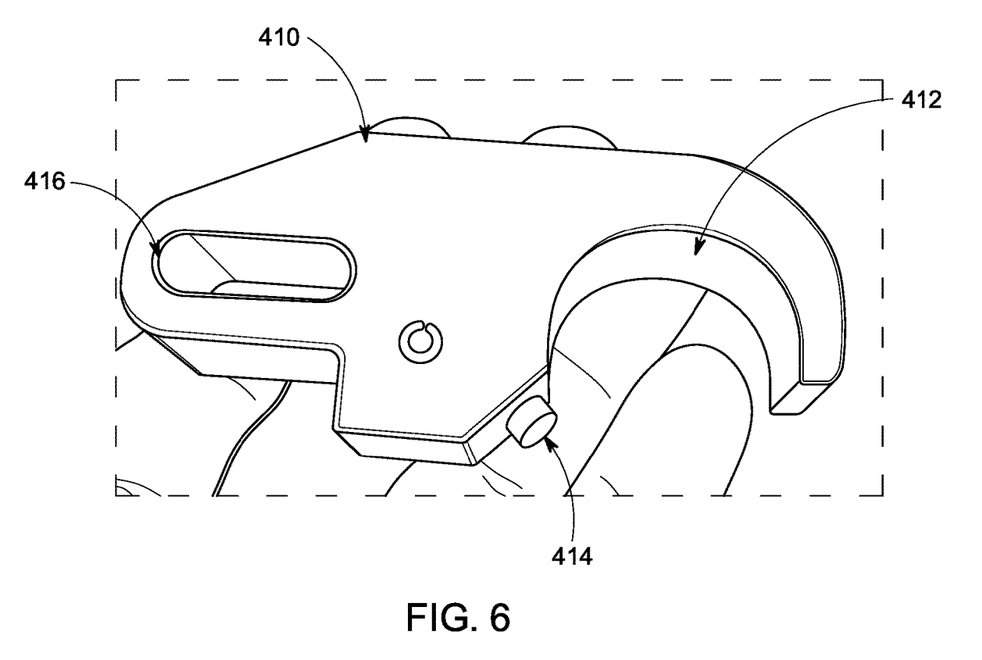
FIG. 6 shows a perspective view of the pivoting window engaging portion of the latch mechanism adapted to hold the pivoting window in a selected position with respect to the secondary window frame according to the preferred embodiment of the present invention of FIG. 3.
Figure 7:
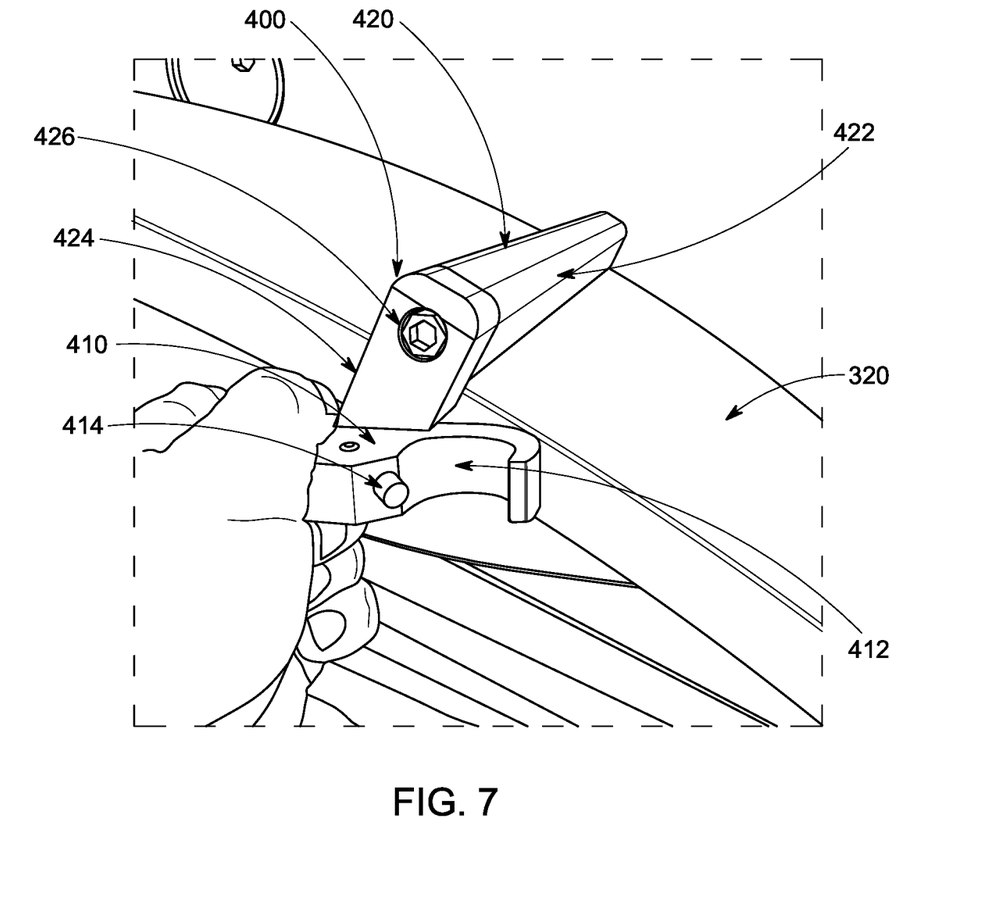
FIG. 7 shows a perspective view of the pivoting window engaging portion attached to the vehicle arm engaging portion of the latch mechanism which is attached to an arm of the motor grader vehicle and adapted to hold the pivoting window in a selected position with respect to the secondary window frame according to the preferred embodiment of the present invention of FIG. 3.
Figure 8:
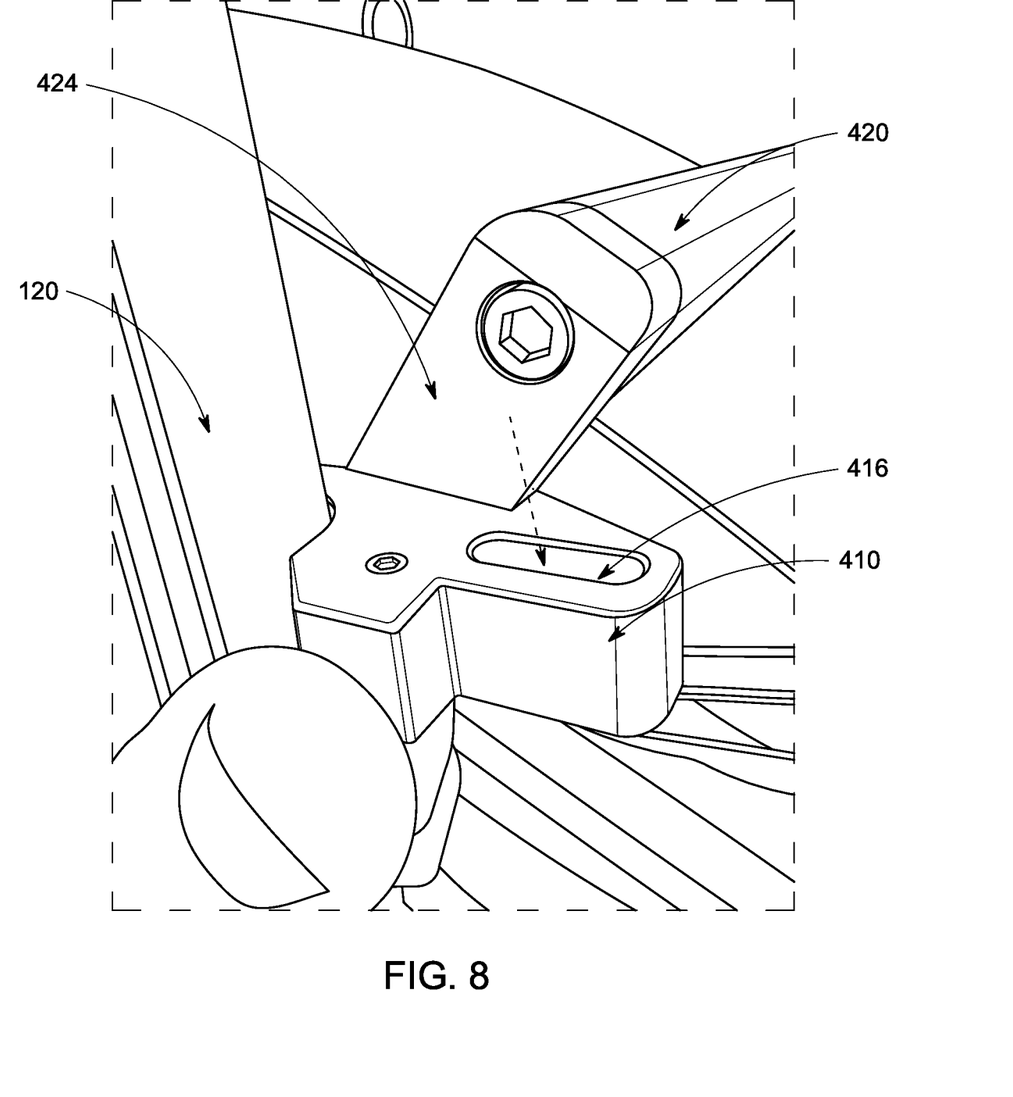
FIG. 8 shows a perspective view of the pivoting window being attached to the pivoting window engaging portion of the latch mechanism adapted to hold the pivoting window in a selected position with respect to the secondary window frame according to the preferred embodiment of the present invention of FIG. 3.

In the preferred embodiment, the vehicle arm engaging portion 420 includes an elongated L-shaped portion 422 adapted to be placed upon the arm 320 of the vehicle, a side portion 424 releasably connected to a distal end of the L-shaped portion, and a screw 426 adapted to releasably connect the side portion to said distal end of the L-shaped portion and thereby releasably clamp to the arm of the vehicle. Furthermore, the pivoting window engaging portion 410 of the latch 400 further comprises a slot 416 adapted to releasably engage the side portion of the latch.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention.

Although the invention has been explained in relation to its preferred embodiment, it is to be understood that many other possible modifications and variations can be made without departing from the spirit and scope of the invention.

What is claimed is:

1. A kit for retrofitting a window of a vehicle, comprising:
   a secondary window frame;
   wherein said secondary window frame is attached to a window frame of said vehicle, provides additional clearance between a pivoting window and any adjacent panels or parts of said vehicle;

at least one connector;
   wherein said at least one connector connects said secondary window frame to said window frame of said vehicle; and
a latch;
   wherein said latch holds said pivoting window in a selected position with respect to said secondary window frame;
wherein when said kit is in use said pivoting window is detached from said window frame of said vehicle; said secondary window frame is attached to said window frame of said vehicle via said at least one connector; said pivoting window is then pivotally attached to said secondary window frame; and then said latch is removably attached between an arm of said vehicle and said pivoting window, such that said pivoting window is held in a selected position with respect to said secondary window frame.

2. The kit of claim 1, wherein said secondary window frame includes at least one hinge; wherein said at least one hinge is adapted to releasably and pivotally attach said pivoting window of said vehicle to said secondary window frame, such that said pivoting window is adapted to pivot with respect to said secondary window frame.

3. The kit of claim 1, wherein said connector is formed as at least one screw.

4. The kit of claim 1, wherein said latch comprises:
a vehicle arm engaging portion;
   wherein said vehicle arm engaging portion is adapted to be releasably secured to said arm of said vehicle; and
a pivoting window engaging portion including:
   a slot;
      wherein said slot is adapted to receive a portion of said pivoting window therein; and
   a biased pin;
      wherein said biased pin is adapted to releasably hold said portion of said pivoting window within said slot;
   wherein said pivoting window engaging portion is attached to said arm engaging portion;
wherein when in use said latch is releasably secured to said arm of said vehicle, then a side edge of said pivoting window is pushed against said biased pin of said pivoting window engaging portion and into said slot for releasably holding therein; and when desired said biased pin is pushed in such that said pivoting window can be removed from within said slot and pivoted into a closed position with respect to said window frame of said vehicle.

5. The kit of claim 4, wherein said vehicle arm engaging portion includes:
an elongated L-shaped portion;
   wherein said elongated L-shaped portion is adapted to be placed upon said arm of said vehicle;
a side portion;
   wherein said side portion is releasably connected to a distal end of said L-shaped portion; and
a screw;
   wherein said screw is adapted to releasably connect said side portion to said distal end of said L-shaped portion and thereby releasably clamp to said arm of said vehicle.

6. The kit of claim 5, wherein said pivoting window engaging portion of said latch further comprises:
a slot;
   wherein said slot is adapted to releasably engage said side portion of said latch.

7. A combination of a vehicle and a kit for retrofitting a window of said vehicle, comprising:
a vehicle including:
   a main body;
   a window frame;
      wherein said window frame is attached to said main body;
   a pivoting window;
      wherein said pivoting window is pivotally attached to said window frame; and
   at least one arm;
      wherein said at least one arm extends outwardly from said main body; and
a kit for retrofitting said window of said vehicle comprising;
   a secondary window frame;
      wherein said secondary window frame is attached to said window frame of said vehicle, and provides additional clearance between a pivoting window and any adjacent panels or parts of said vehicle;
   at least one connector;
      wherein said at least one connector connects said secondary window frame to said window frame of said vehicle; and
   a latch;
      wherein said latch is attached between said at least one arm and said pivoting window and hold said pivoting window in a selected position with respect to said secondary window frame;
   wherein when said kit is in use said pivoting window is detached from said window frame of said vehicle; said secondary window frame is attached to said window frame of said vehicle via said at least one connector; said pivoting window is then pivotally attached to said secondary window frame; and then said latch is removably attached between said arm of said vehicle and said pivoting window, such that said pivoting window is held in a selected position with respect to said secondary window frame.

8. The combination of claim 7, wherein said secondary window frame includes at least one hinge; wherein said at least one hinge is adapted to releasably and pivotally attach said pivoting window of said vehicle to said secondary window frame, such that said pivoting window is adapted to pivot with respect to said secondary window frame.

9. The combination of claim 7, wherein said connector is formed as at least one screw.

10. The combination of claim 7, wherein said latch comprises:
a vehicle arm engaging portion;
   wherein said vehicle arm engaging portion is adapted to be releasably secured to said arm of said vehicle; and
a pivoting window engaging portion including:
   a slot;
      wherein said slot is adapted to receive a portion of said pivoting window therein; and
   a biased pin;
      wherein said biased pin is adapted to releasably hold said portion of said pivoting window within said slot;
   wherein said pivoting window engaging portion is attached to said arm engaging portion;
wherein when in use said latch is releasably secured to said arm of said vehicle, then a side edge of said pivoting window is pushed against said biased pin of said pivoting window engaging portion and into said slot for releasably holding therein; and when desired said biased pin is pushed in such that said pivoting window can be removed from within said slot and pivoted into a closed position with respect to said window frame of said vehicle.

11. The combination of claim 10, wherein said vehicle arm engaging portion includes:
an elongated L-shaped portion;
   wherein said elongated L-shaped portion is adapted to be placed upon said arm of said vehicle;
a side portion;
   wherein said side portion is releasably connected to a distal end of said L-shaped portion; and
a screw;
   wherein said screw is adapted to releasably connect said side portion to said distal end of said L-shaped portion and thereby releasably clamp to said arm of said vehicle.

12. The combination of claim 11, wherein said pivoting window engaging portion of said latch further comprises:
a slot;
   wherein said slot is adapted to releasably engage said side portion of said latch.

* * * * *